United States Patent
Ogura et al.

(10) Patent No.: US 7,148,927 B2
(45) Date of Patent: Dec. 12, 2006

(54) SIGNAL READOUT STRUCTURE FOR AN IMAGE SENSING APPARATUS

(75) Inventors: Masanori Ogura, Kanagawa (JP); Fumihiro Inui, Kanagawa (JP); Tetsuya Itano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 728 days.

(21) Appl. No.: 10/376,084

(22) Filed: Feb. 28, 2003

(65) Prior Publication Data

US 2003/0193585 A1    Oct. 16, 2003

(30) Foreign Application Priority Data

Mar. 1, 2002    (JP)    ............... 2002-056420

(51) Int. Cl.
- H04N 3/14    (2006.01)
- H04N 5/335    (2006.01)
- H04N 9/04    (2006.01)
- H04N 9/083    (2006.01)

(52) U.S. Cl. ............ 348/281; 348/273; 348/279; 348/301; 348/302

(58) Field of Classification Search ............ 348/272, 348/222.1, 273, 280, 311, 282, 281, 294, 348/302, 301, 308; 250/208.1
See application file for complete search history.

(56) References Cited

U.S. PATENT DOCUMENTS

| | | | |
|---|---|---|---|
| 5,018,006 A * | 5/1991 | Hashimoto | 348/275 |
| 6,512,546 B1 * | 1/2003 | Decker et al. | 348/308 |
| 6,570,615 B1 * | 5/2003 | Decker et al. | 348/272 |

FOREIGN PATENT DOCUMENTS

| | | |
|---|---|---|
| JP | 57-186884 | 11/1982 |
| JP | 58-142688 | 8/1983 |
| JP | 62-159994 | 7/1987 |
| JP | 63-135085 | 6/1988 |
| JP | 4-91591 | 3/1992 |
| JP | 5-74992 | 10/1993 |
| JP | 05-328224 | 12/1993 |
| JP | 09-046480 | 2/1997 |
| JP | 11-98516 | 4/1999 |
| JP | 11-275594 | 10/1999 |
| JP | 2000-78475 | 3/2000 |
| JP | 2001/245221 A | 9/2001 |
| JP | 2002-165225 | 6/2002 |
| WO | WO 00/45333 | 3/2000 |

* cited by examiner

Primary Examiner—Ngoc-Yen Vu
Assistant Examiner—Gregory Madden
(74) Attorney, Agent, or Firm—Morgan & Finnegan, LLP

(57) ABSTRACT

An image sensing apparatus includes a photoelectric converter having a plurality of pixels covered by a color filter composed of a plurality of colors, a plurality of common readout units adapted to sequentially output signals from the plurality of pixels, a time division multiplex (TDM) unit for time division multiplexing signals from the plurality of common readout units, and a readout control unit for reading the signals from the plurality of pixels to the common readout units in such a way that signals from pixels covered by color filters of the same color are continuously multiplexed.

11 Claims, 13 Drawing Sheets

SIGNAL READOUT STRUCTURE FOR AN IMAGE SENSING APPARATUS

FIELD OF THE INVENTION

The present invention relates to an image sensing apparatus, and more particularly, to a signal readout structure for an image sensing apparatus.

BACKGROUND OF THE INVENTION

Recent technical advances in digital still cameras, digital video cameras and other such image input devices have tended to provide sensors with more and more picture elements (hereinafter pixels) in order to further improve the quality of the images formed, with the result that higher readout speeds are required as well. In order to meet such a need, a readout method has been developed by which the pixel signals have been divided into a plurality of readout channels. A description of this conventional method is now given with reference to FIGS. 11 and 12.

FIG. 11 is a diagram of the structure of a conventional image sensing apparatus. FIG. 12 is a timing chart showing the drive timing and output signals of a conventional image sensing apparatus.

The image sensing apparatus shown in FIG. 11 has a plurality of pixels 3101 arranged in two dimensions and consisting of optical black pixels arranged and shielded by a light-blocking film and effective pixels with no light-blocking film; readout channels 3071 and 3072 for reading out image signals from each of the plurality of pixels selected according to a control signal from a vertical scan circuit 3102; and an output terminal 3120 for outputting signals after increasing either the waveform or the drive force of the signals after the timing with which the signals are read out by the readout channels 3071, 3072 has been adjusted and the signals have been passed through a buffer circuit 3119. Note that only 5×4 pixels are shown in FIG. 11 for simple explanation.

In addition, the readout channels 3071, 3072 have readout circuits 3106, 3111, which in turn have line memories 3104, 3109 for storing pixel signals read from each of the plurality of pixels 3101 and horizontal scan circuits 3105, 3110 for forwarding the stored pixel signals in response to horizontal shift pulses input from input terminals 3122, 3123. In addition, the readout channels 3071, 3072 also have amplifiers 3107, 3112 for amplifying the signals that are read out and clamps 3124, 3125 for clamping the amplified signals at a particular electric potential.

A description is now given of the operation of the conventional fixed image sensing apparatus having the structure described above, with reference to FIG. 11.

First, when light strikes each of the plurality of pixels 3101, the pixels 3101 generate pixel signals of a level determined by the amount of incoming light. Next, pixel signals read out from odd-numbered columns in a row of pixels 3101 selected by the vertical scan circuit 102 are stored in the line memory circuit 3104, and at the same time pixel signals read from even-numbered columns in the same row are stored in the line memory circuit 3109.

Next, the horizontal scan circuit 3105 inputs a horizontal shift pulse from either outside or inside the chip from the input terminal 3122. Based on the input horizontal shift pulse, the pixel signals read out to the line memory circuit 3104 are then sequentially selected and output to the amplifier 3107. At the amplifier 3107, the input pixel signals are amplified and output to a processing circuit (not shown in the diagram) from an output terminal 3108.

Similarly, the horizontal scan circuit 3110, based on a horizontal shift pulse input from the input terminal 3123, sequentially selects pixel signals read out to the line memory circuit 3109 and outputs them to the amplifier 3112. At the amplifier 3112, the input pixel signals are amplified and output to a processing circuit (not shown in the diagram) from the output terminal 3113.

In addition, the dark level signals output from the optical black pixels within the plurality of pixels 3101 are then clamped at a desired electric potential using clamps 3124, 3125. Further, at each of output terminals 3108 and 3113, switches 3116 and 3117 connected in parallel are switched ON/OFF in alternating sequence so as to output pixel signals from the odd-numbered columns of pixels and the even-numbered columns of pixels from the output terminal 3120 via the output buffer circuit 3119.

FIG. 12 shows horizontal shift pulses 1 and 2 input at input terminals 3122, 3123 of FIG. 11, a dark level signal and a pixel signal output from output terminals 3108 and 3113, a clamp pulse clamping, the ON/OFF action of the switches 3116 and 3117, and a dark level signal and a pixel signal output from output terminal 3120. FIG. 12 shows a state in which a pulse wave is input to input terminals 3122, 3123 in, for example, 6 clock parts each.

In FIG. 12, of the signals output from output terminal 3120, the pixel signals and dark level signals read out from pixels of a given row of columns 1–12 are assigned reference numerals (1)–(12), respectively. Also, pixel signals of output terminals 3108 and 3113 are given reference numerals corresponding to those of the signals at output terminal 3120. Reference numerals (1)–(6) correspond to dark level signals obtained from the optical black pixels and reference numerals (7)–(12) correspond to the pixel signals from the effective pixels.

According to FIG. 12, the dark level signals (1), (3) and (5) and the pixel signals (7), (9) and (11), synchronized to horizontal shift pulse 1, are sequentially output at the output terminal 3108. Similarly, dark level signals (2), (4) and (6) and pixel signals (8), (10) and (12), synchronized to horizontal shift pulse 2, are sequentially output at the output terminal 3113. By activating the clamps 3124, 3125 at the point at which the dark level signals (1) and (2) are output from the output terminals 3108, 3113, the dark level signals are clamped at a desired electric potential.

Next, by switching switches 3116 and 3117 ON/OFF in alternate succession, the dark level signals (1)–(6) and the pixel signals (7)–(12) are output at the output terminal 3120. By so doing, although the output terminals 3108 and 3113 operate at half-cycle with respect to the clock rate at output terminal 3120, the readout speed can be increased relatively easy.

Moreover, when reading out signals using multiple channels as described above, a structure that always reads out signals of the same color from the channels is disclosed in Japanese Patent Application Laid-Open No. 9-46480, and a method for correcting offset error at each channel is disclosed in Japanese Patent Application Laid-Open No. 2001-245221.

Moreover, Patent Application Japanese Laid-Open No. 5-328224 discloses a structure using multiple channels to read a plurality of pixels in the horizontal direction and using a switch to perform time division multiplexing on the signals read by the multiple channels. According to such a structure, even if the readout speed at each of the channels is slow, the charge readout can be read at high speed and the number of terminals can be reduced by time division multiplexing of the read-out electric charge signals.

However, Japanese Laid-Open Patent Application No. 9-46480 and 2001-245221 have a disadvantage in that they increase the number of output pins because four or five output pins are required for each output terminal. In addition, Japanese Laid-Open Patent Application No. 5-328224 has the following problem, described with reference to FIG. 13.

FIG. 13 is a diagram of the structure of another conventional image sensing apparatus, illustrating the adaptation of the structure disclosed in Japanese Laid-Open Patent Application No. 5-328224 to a color readout. For the sake of simplicity, two horizontal scan circuits are used to read out a charge from two pixels at a time. In FIG. 13, a plurality of pixels 1 are covered by a Bayer arrangement filter, with the G-B pixel columns being read by the first horizontal scan circuit 3 and the R-G pixel columns being read by the second horizontal scan circuit 4.

In a case in which, as depicted here, an Nth line is selected and read out by the vertical scan circuit 2, a G signal of every other pixel is continuously output from a first differential amplifier 5 and an R signal of every other pixel is continuously read out from a second differential amplifier 6. When time division multiplexed by a multiplexer 7, these G and R signals are output in alternating sequence from an output terminal (OUT).

However, by outputting signals of different colors from a single output terminal using such multiplexing as described above, there is a risk that the two colors will mix, and in any case such an arrangement complicates downstream signal processing circuit structures for operations such as signal separation outside semiconductor image sensing apparatuses.

The reason is as follows: Parasitic resistance R and parasitic capacitance C occurs in the wires inside the image sensing apparatus, and a change in electric potential in such wiring can be explained as a transient phenomenon. That is, the electric potential change in wiring with such parasitic elements is determined by the parasitic resistance R and the parasitic capacitance C, and with a time constant CR, a V(t) can be expressed by equation (1):

$$V(t) = V_{o_\epsilon} - (1/RC)t \quad (1)$$

where $V_o$ is the electric potential in a steady state of the wiring and $\epsilon$ is a natural constant.

As can be understood from equation (1), V(t) changes exponentially with time and approaches $V_o$.

Thus, the waveform output from the output terminal 3120 of FIG. 11 (output terminal 3120 of FIG. 12) has a different output level at (7) and (8), so it takes time for the electric potential to fall from (7) to (8), as is the case with the output level in the transition from (6) to (7). One of the reasons for the large differences in the continuous output level at the output terminal 3120 is that the outputs from terminals 3113 and 3108 are outputs from pixels of color filters of different transmissivity.

SUMMARY OF THE INVENTION

Accordingly, the present invention has been made in consideration of the above-described situation, and has as its object to output signals of all colors at high speed from a color image sensing apparatus as well as form an image of superior picture quality which avoids color mixing even when multiplexing signals from multiple output systems at high speed with a comparatively simple structure, while holding the number of output pins to a minimum.

According to the present invention, the foregoing objects are attained by providing an image sensing apparatus comprising: a photoelectric converter having a plurality of pixels covered by color filters composed of a plurality of colors; a plurality of common readout units adapted to sequentially output signals from the plurality of pixels, a time division multiplex (TDM) unit adapted to perform time division multiplexing on signals from the plurality of common readout units so as to output time division multiplexed signals; and a read-out control unit adapted to read out the signals from the plurality of pixels to the common readout units so that signals from pixels covered with color filters of the same color are multiplexed continuously.

Other objects, features, effects and advantages of the present invention will be apparent from the following description, taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DETAILED DESCRIPTION OF THE PREFERRED EMBODIMENTS

Preferred embodiments of the present invention will be described in detail in accordance with the accompanying drawings.

(First Embodiment)

Figure 1:
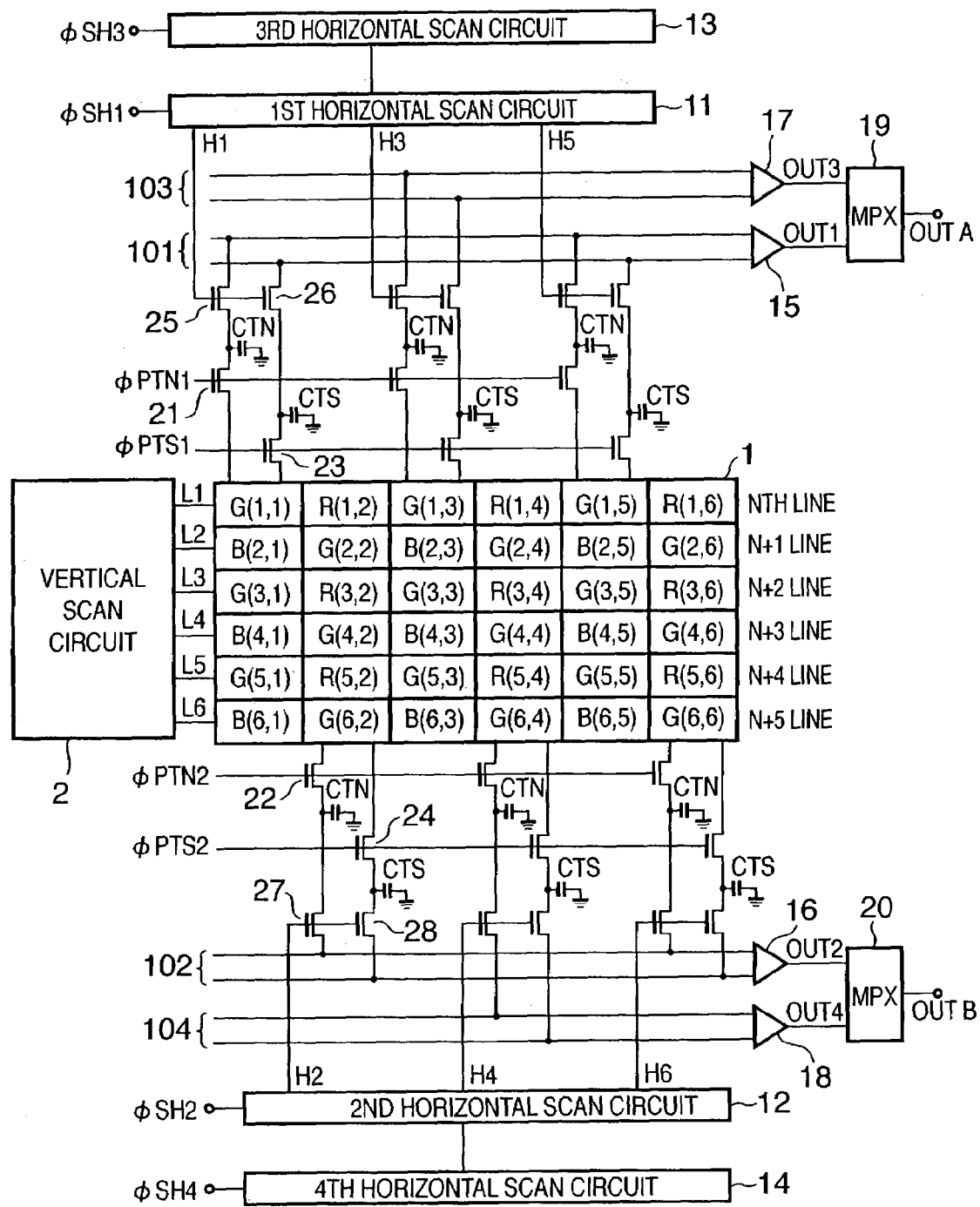
FIG. 1 is a diagram of the structure of an image sensing apparatus according to a first embodiment of the present invention.
Figure 2:
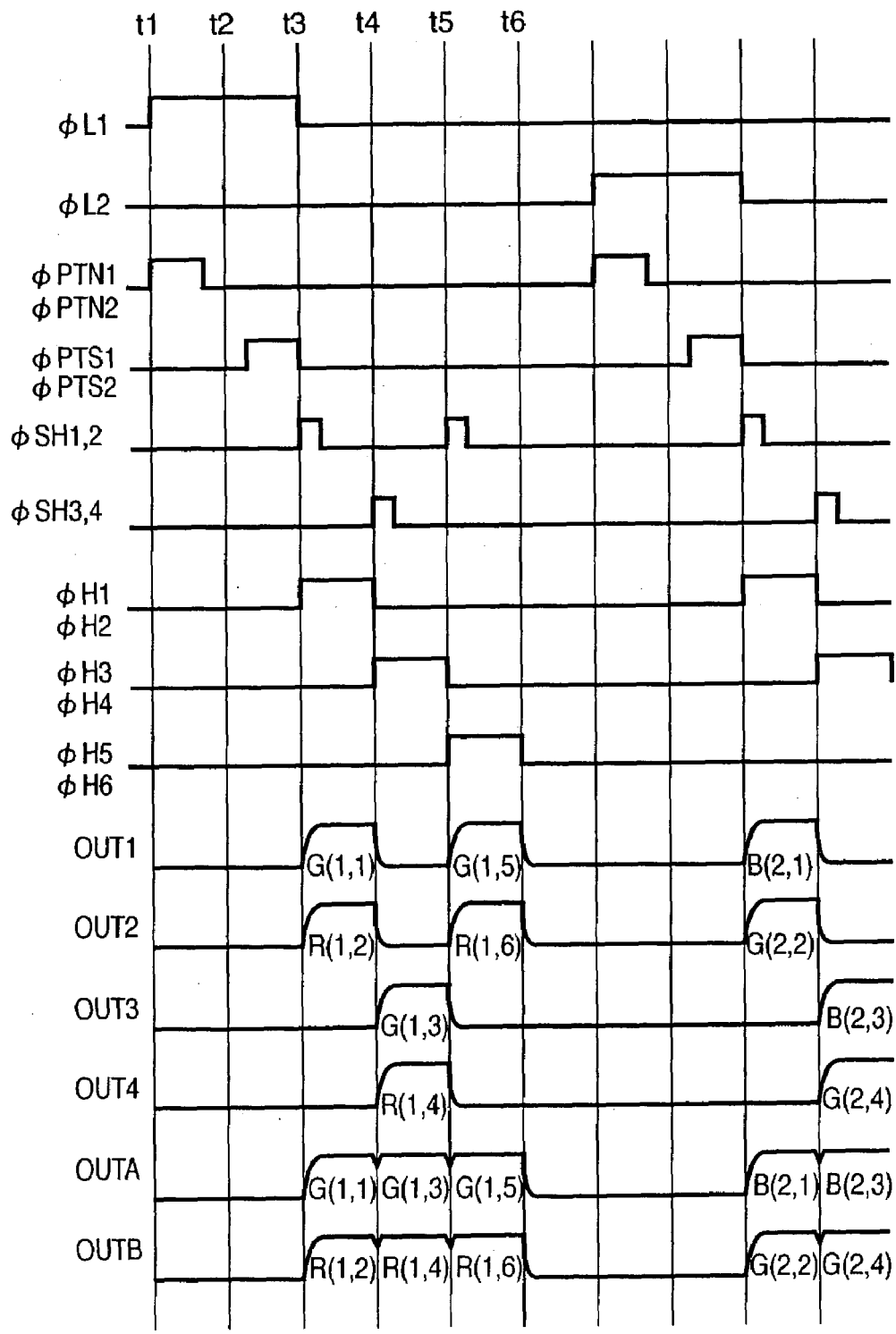
FIG. 2 is a timing chart showing the drive timing and output signals of the image sensing apparatus of FIG. 1.

A description is now given of the first embodiment of the present invention, with reference to FIGS. 1 and 2.

FIG. 1 is a diagram of the structure of an image sensing apparatus according to a first embodiment of the present invention. FIG. 2 is a timing chart showing the drive timing and output signals of the image sensing apparatus of FIG. 1.

In FIG. 1, reference numeral 1 denotes a pixel having a Bayer arrangement color filter. The numbers inside the parentheses next to the color designations R (red), G (green) and B (blue), are the pixel coordinates. It should be noted that, for simplicity of description, the present example uses a 6×6 arrangement of pixels, but in fact an extremely large number of pixels are arrayed in an actual arrangement.

The pixels 1 are each connected to line selection lines L1–L6 at each line, with the line selection lines L1–L6 being turned HIGH (hereinafter H) in sequence by line selection signals supplied from the vertical scan circuit 2 and a line for reading the charge is selected. In the example shown in FIG. 2, a line selection signal ΦL1 supplied to the line selection line L1 is H, selecting the first line (at a time t1). At substantially the same time at which the readout line is selected and prior to the readout of the charge, signals ΦPTN1 and ΦPTN2 are turned H and MOS 21, 22 are turned ON, reading the noise component of the selected line out to a capacitor CTN. Next, at a time t2, signals ΦPTS1 and ΦPTS2 are turned H and MOS 23, 24 are turned ON, so that the photoelectric charge accumulated in the pixels 1 of the selected line (which is a photoelectric charge overlaid with a noise component) is read out to the capacitor CTS. By so doing, the noise component and the image signal component overlaid by the noise component of the pixels 1 are each handled by the capacitors CTN and CTS, respectively.

Next, the charges held in capacitors CTN, CTS are sent to differential amplifiers 15–18 by column selection signals supplied from first through fourth horizontal scan circuits 11–14 comprised of shift resistors. The differential amplifiers 15–18 subtract the noise components from the image signal components overlaid by the noise components and output image signals from which the noise components are deleted.

At a time t3, the first and second horizontal scan circuits 11, 12 turn ΦH1 and ΦH2 to H and the corresponding MOS 25–28 ON, so that the charges read from G (1,1) and R (1,2) to the capacitors CTN, CTS are each sent to the differential amplifiers 15 and 16 via signal lines 101, 102. Differential amplifier 15 deletes the noise component from the photoelectric charge overlaid with the noise component and outputs (OUT1) an image signal (denoted by the same reference numeral as the pixels, in this case G (1,1)). Similarly, differential amplifier 16 outputs image signal R (1,2) (OUT2). Multiplexers 19 and 20 each select differential amplifiers 15 and 16 and output image signals G(1,1) and R(1,2), respectively.

Then, at a time t4, the third and fourth horizontal scan circuits 13 and 14 turn ΦH3 as well as ΦH4 to H, sending the charges read to the capacitors CTN and CTS from G(1,3) and R(1,4) to the respective differential amplifiers 17 and 18 via the signal lines 103, 104.

Then, the differential amplifier 17 removes the noise component from the photoelectric charge overlaid with the noise component, outputting image signal G(1,3) (OUT3). Similarly, the differential amplifier 18 outputs image signal R (1,4) (OUT4). The multiplexers 19 and 20 then output image signals G(1,3) and R(1,4), respectively, by selecting the differential amplifiers 17, 18.

By repeating the above-described process for each horizontal line, G signals G(1,1), G(1,3), G(1,5) of every other pixel are output from output terminal OUT A of multiplexer 19 and R signals R(1,2), (1,4), (1,6) of every other pixel are output from output terminal OUT B of multiplexer 20.

Similarly, selecting a second line by having the vertical scan circuit 2 turn ΦL2 to H and repeating the above-described operation for one line causes B signals B(2,1), B(2,3), B(2,5) of every other pixel to be output from output terminal OUT A of multiplexer 19, and G signals G(2,2), G(2,4) and G(2,6) of every other pixel to be output from output terminal B of multiplexer 20.

As described above, according to the first embodiment of the present invention, by reading out and multiplexing signals output via multiple readout signal lines, the speed of readout can be improved and at the same time the number of output pins can be reduced compared to a case in which signals are output directly from the readout signal lines. Also, because the present invention multiplexes signals of the same color, the signal level of the outputs from OUT A and B can be kept virtually steady, thus avoiding color mixing and making it possible to output color signals from a color fixed image sensing apparatus at high speeds. Also, by allotting the color output system among multiple readout means as shown in FIG. 1 like the first embodiment, it becomes possible to multiplex the top two system readout means as well as the bottom two system readout means. Moreover, since the top OUT1 and OUT3 are adjacent to each other, and since the bottom OUT2 and OUT4 are also adjacent to each other, the problem of delay and the drive force can be ignored so that the timing of the multiplexing can be adjusted easily.

Moreover, since signals of the same color are output from the output pins, there is no need to perform color separation at a downstream signal processing circuit, thus making it possible to simplify the structure and the processes of such signal processing circuit.

(Second Embodiment)

A description will now be given of the second embodiment of the present invention, with reference to the accompanying drawings.

It should be noted that, in order to simplify the explanation, a description of the drive method and noise deletion method is omitted for the second and all subsequent embodiments of the present invention described herein below.

Figure 3:
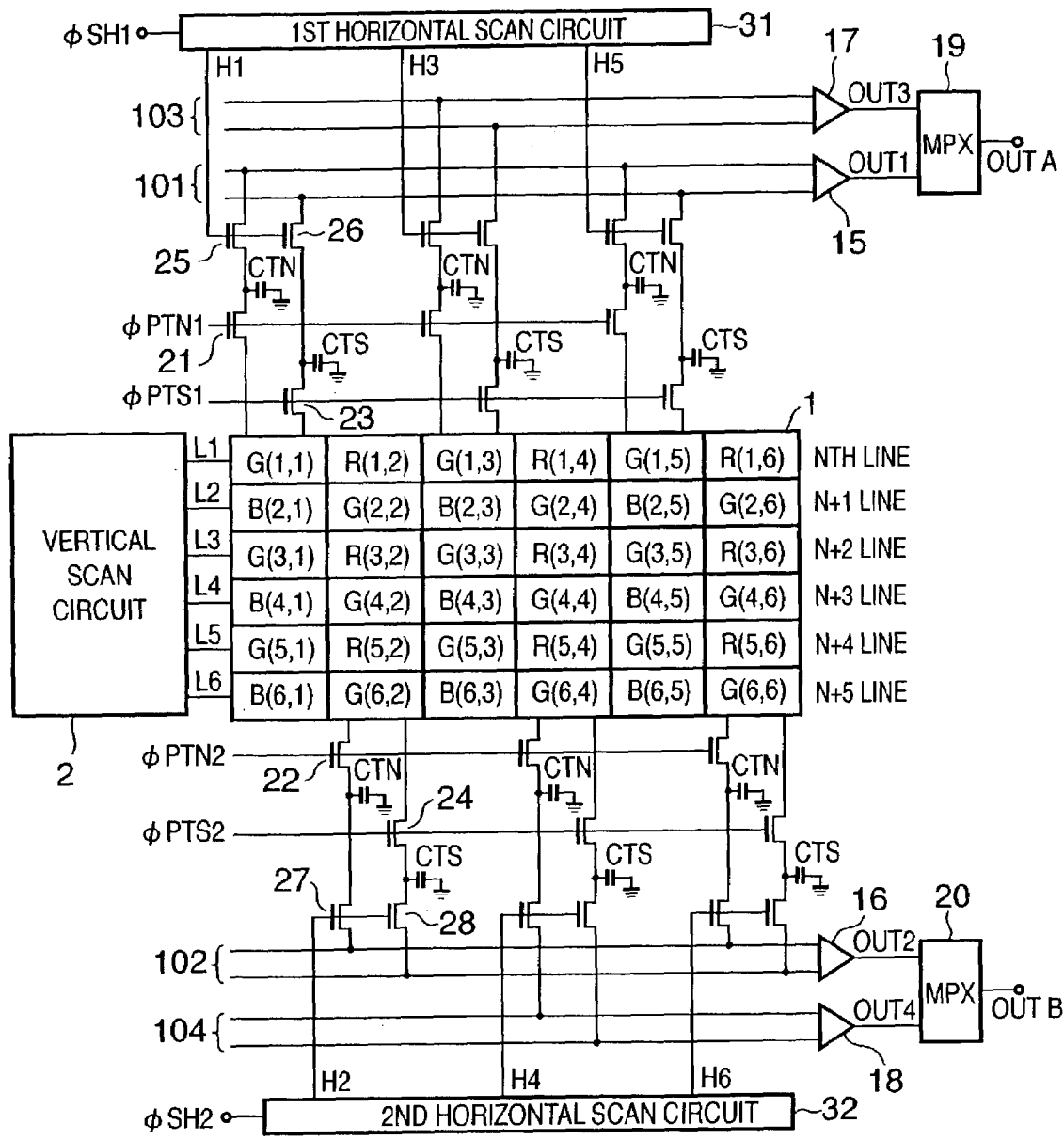
FIG. 3 is a diagram of the structure of an image sensing apparatus according to a second embodiment of the present invention.
Figure 4:
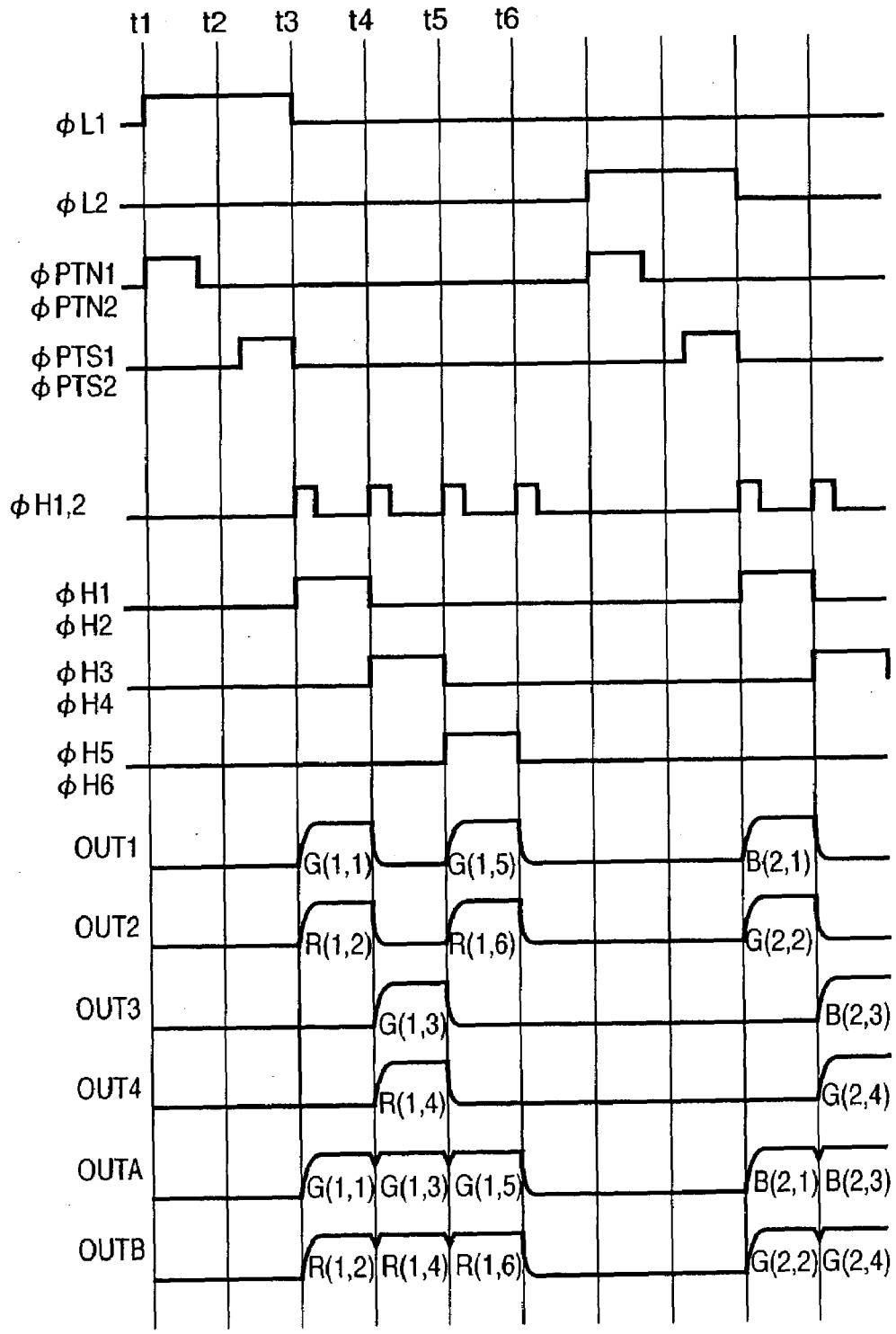
FIG. 4 is a timing chart showing the drive timing and output signals of the image sensing apparatus of FIG. 3.

FIG. 3 is a diagram of the structure of an image sensing apparatus according to a second embodiment of the present invention. FIG. 4 is a timing chart showing the drive timing and output signals of the image sensing apparatus of FIG. 3. As can be seen in FIG. 3, in the second embodiment, the first and third horizontal scan circuits 11 and 13 of the first embodiment shown in FIG. 1, as well as the second and fourth horizontal scan circuits 12 and 14 also shown in FIG. 1, have each been replaced with a single horizontal scan circuit. It should be noted that, in FIG. 3, structures that are the same as those shown in FIG. 1 are given identical reference numerals.

In FIG. 3, reference numeral 31 denotes a first horizontal scan circuit and reference numeral 32 denotes a second horizontal scan circuit. As shown in FIG. 4, the cycle of the clock signal supplied to the first and second horizontal scan circuits 31, 32 is twice the drive frequency of the first through fourth horizontal scan circuits 11–14 of the first embodiment.

Based on the cycle of the supplied clock, the first horizontal scan circuit 31 turns ΦH1, ΦH3 and ΦH5 high in succession and the second horizontal scan circuit 32 turns ΦH2, ΦH4 and ΦH6 high in succession, so that readout can be performed at the same timing as that of the first embodiment described above.

(Third Embodiment)

A description will now be given of a third embodiment of the present invention, with reference to the accompanying drawings.

Figure 5:
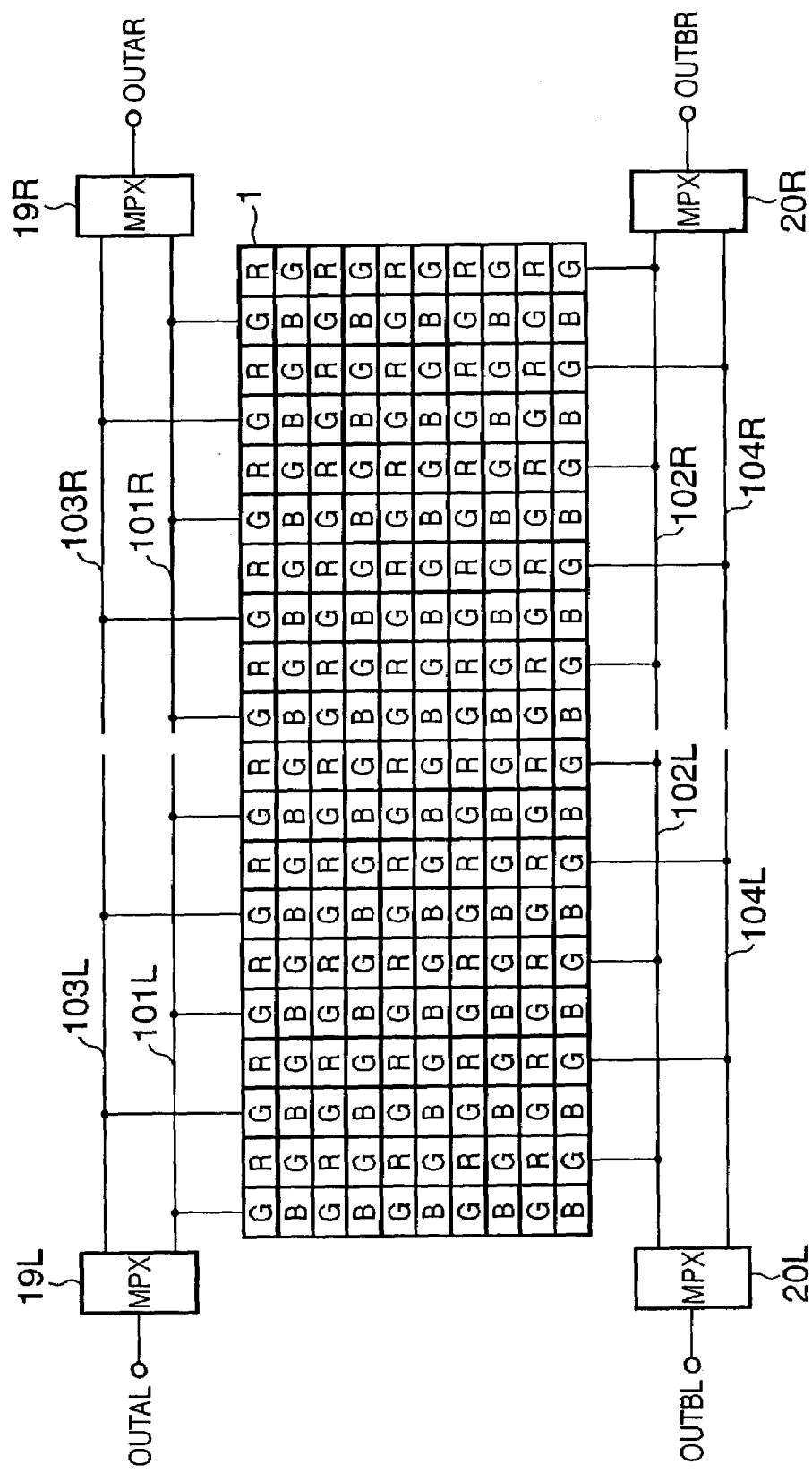
FIG. 5 is a schematic diagram of the structure of an image sensing apparatus according to a third embodiment of the present invention.

FIG. 5 is a schematic diagram of the structure of an image sensing apparatus according to a third embodiment of the present invention. FIG. 5 shows an arrangement in which the signal lines 101–104 depicted in FIG. 1 and FIG. 3 output to left and right lateral directions from a center thereof. It should be noted that, in FIG. 5, structures that are identical to those shown in FIGS. 1 and 3 are given identical reference numerals, and structures equivalent to those shown in FIGS. 1 and 3 but divided into lateral arrangements are given reference numerals followed by the reference symbol R (right) or L (left), as appropriate. Also, as can be appreciated by those of ordinary skill in the art, the structure shown in FIG. 5 can be easily adapted to the image sensing apparatus of the first embodiment described above.

(Fourth Embodiment)

Next, a description is given of a still camera image forming system using the image sensing apparatus described in the first, second and third embodiments described above, with reference to FIG. 10.

Figure 10:
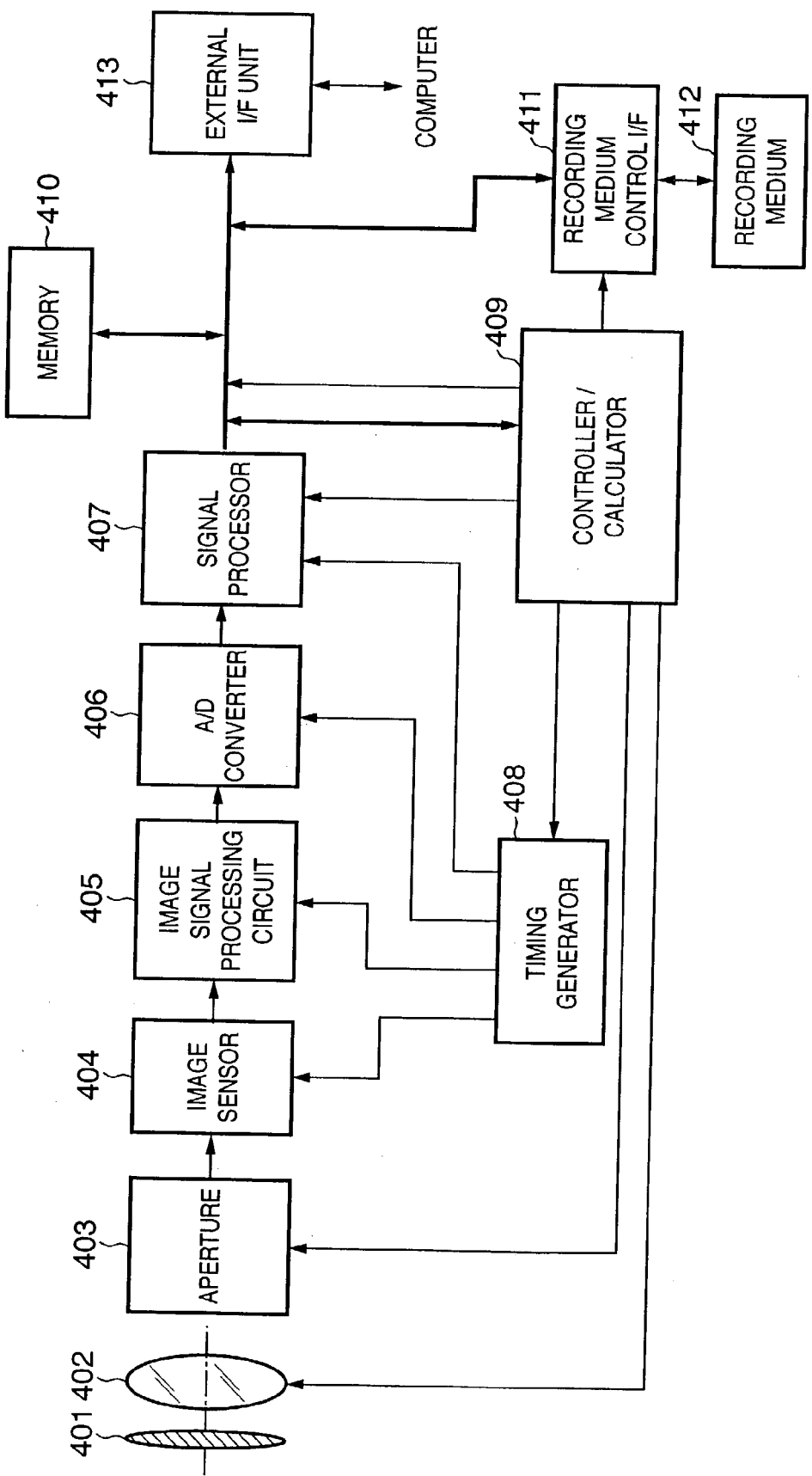
FIG. 10 is a block diagram showing the structure of an image-forming system according to a fourth embodiment of the present invention.
Figure 11:
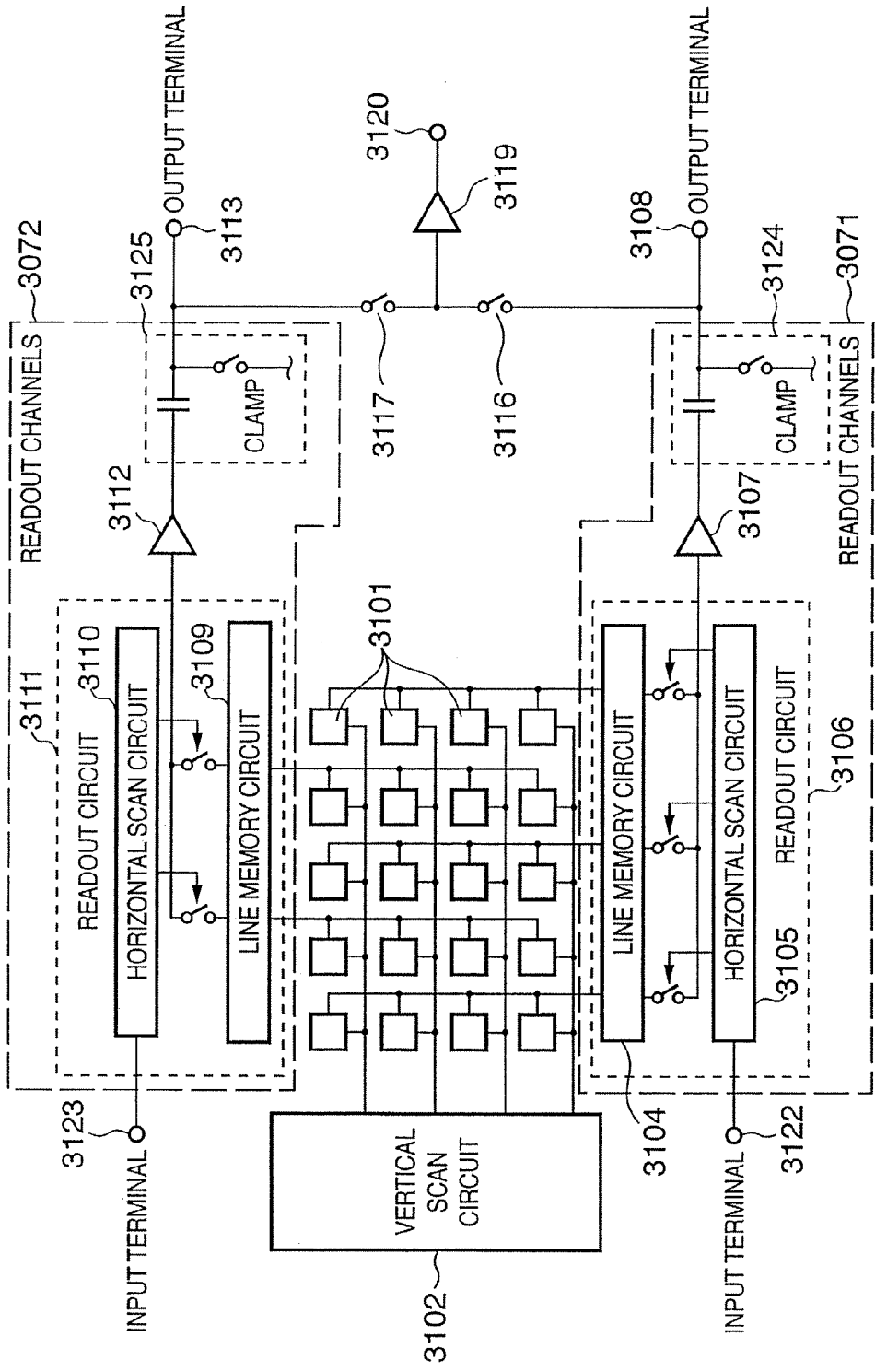
FIG. 11 is a diagram of the structure of a conventional image sensing apparatus.
Figure 12:
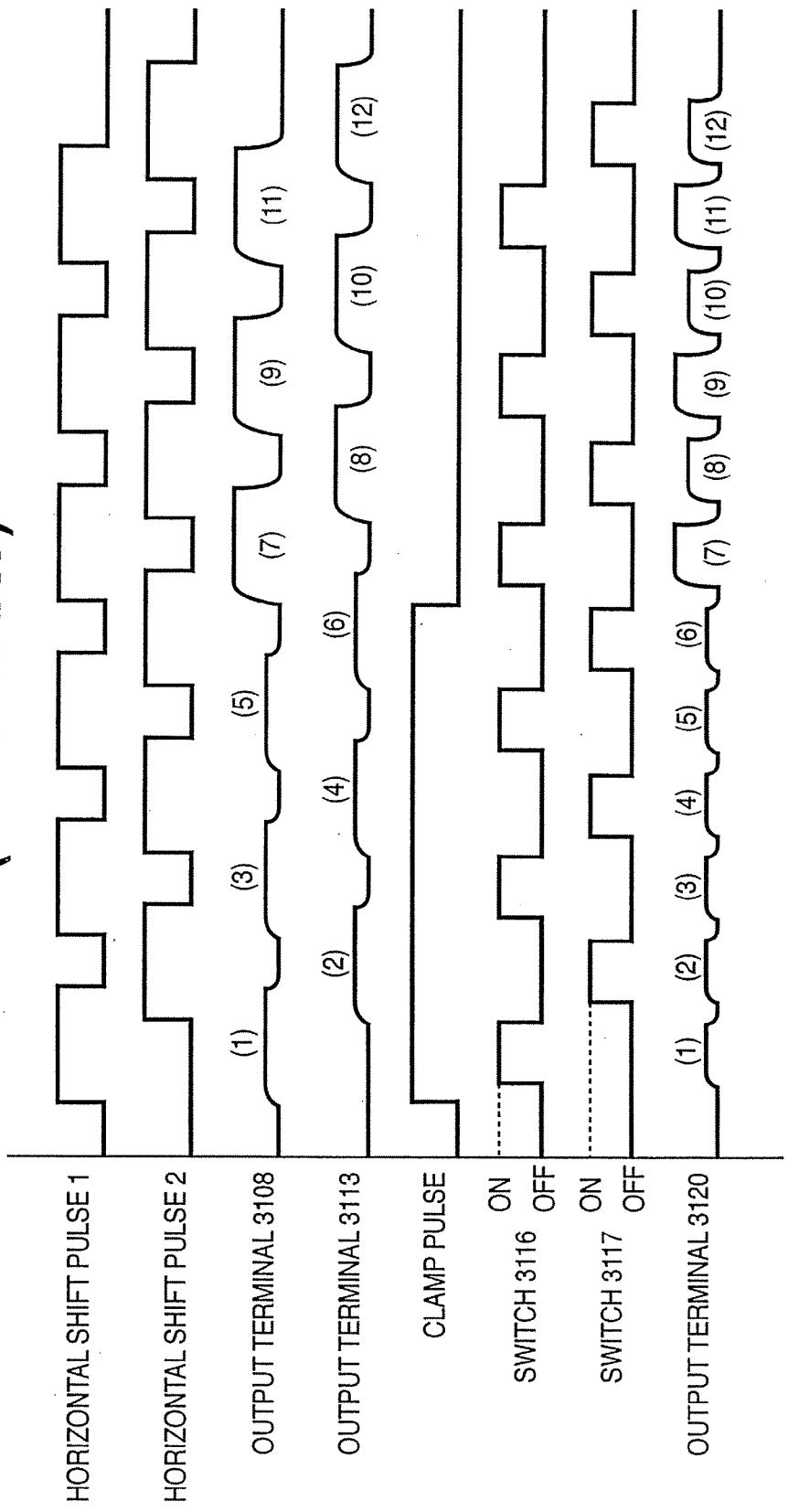
FIG. 12 is a timing chart showing the drive timing and output signals of a conventional image sensing apparatus.
Figure 13:
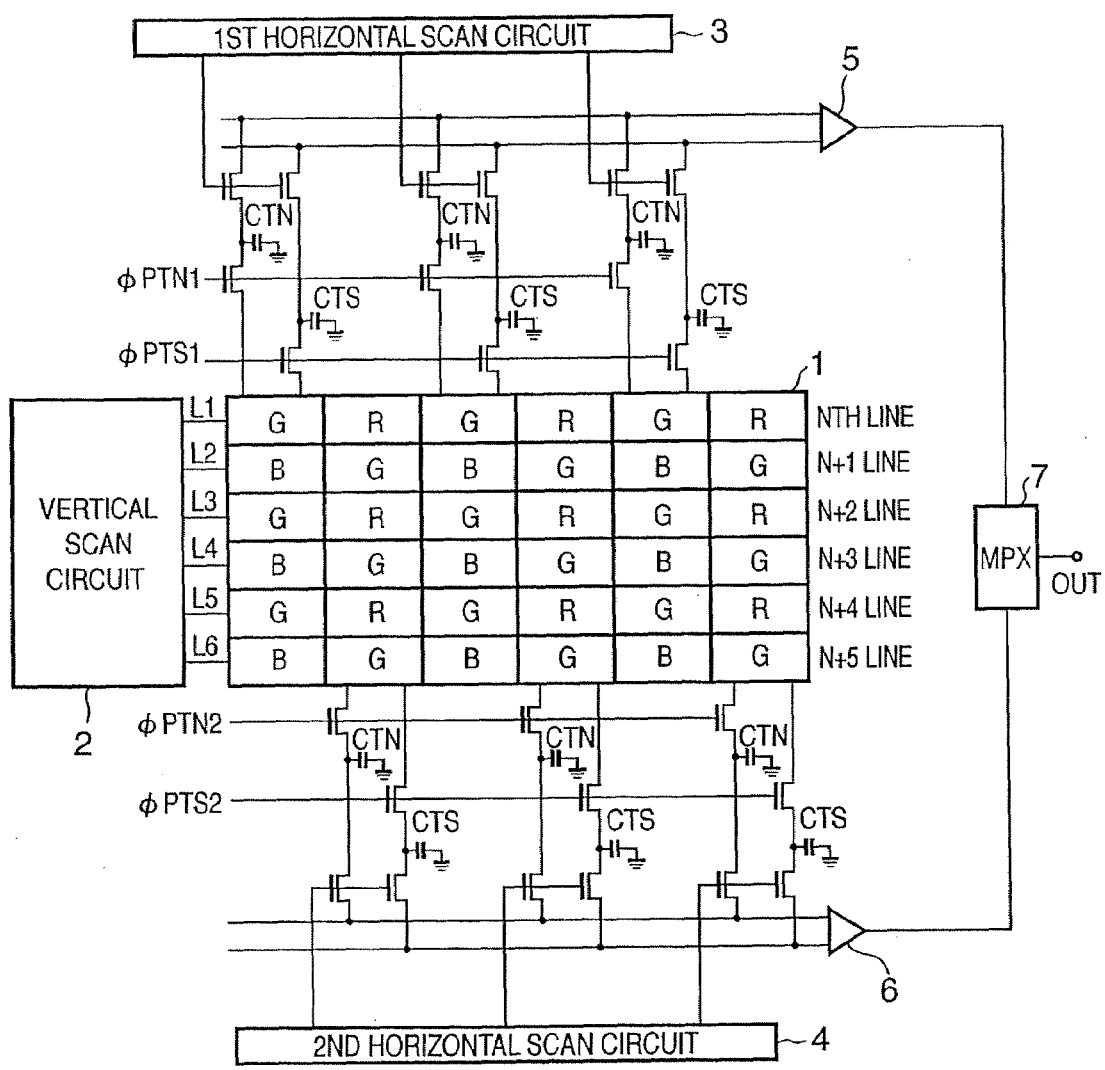
FIG. 13 is a diagram of the structure of another conventional image sensing apparatus.

FIG. 10 is a block diagram showing the structure of an image-forming system according to a fourth embodiment of the present invention. In FIG. 10, reference numeral 401 denotes a barrier that functions as a lens protector and as a main switch. Reference numeral 402 denotes a lens that focuses an optical image of a subject at the image sensing apparatus 404. Reference numeral 403 denotes an aperture for controlling the amount of light that passes through the lens 402. Reference numeral 404 denotes an image sensing apparatus (corresponding to the image sensing apparatus described above in the first, second and third embodiments) for handling the subject optical image formed by the lens 402 as an image signal. Reference numeral 405 denotes an image signal processing circuit that includes a gain variable amplifier for amplifying image signals output from the image sensing apparatus 404 and a gain correction circuit for correcting the gain. Reference numeral 406 denotes an A/D converter for converting the analog image signals output by the image sensing apparatus 404 into digital signals. Reference numeral 407 denotes a signal processor for applying a variety of corrections and compression to image data output from the A/D converter 406. Reference numeral 408 denotes a timing generator for outputting timing signals to the image sensing apparatus 404, the image signal processing circuit 405, the A/D converter 406 and the signal processor 407. Reference numeral 409 denotes a controller/calculator for exerting overall controlling of various calculations and of the still video camera as a whole. Reference numeral 410 denotes a memory for temporarily storing image data. Reference numeral 411 denotes a recording medium control interface for recording on and reading from a recording medium. Reference numeral 412 denotes a semiconductor memory or other detachable recording medium for recording and/or providing image data. Reference numeral 413 denotes an external interface for communicating with an external computer or the like.

Next, a description is given of the operation of the still video camera having the structure described above during image sensing operation.

When the barrier 401 is opened, the main power switch is turned ON, the control system power is turned ON, and further, the power to the image forming system circuitry such as the A/D converter is turned ON.

Then, in order to control the amount of exposure light, the controller/calculator 409 opens the aperture 403 and signals output from the image sensing apparatus 404 are converted from analog signals into digital signals by the A/D converter 406, after which the digital signals are input to the signal processor 407. The controller/calculator 409 gauges the amount of light involved by using data that has undergone predetermined processes by the signal processor 407, determines the brightness and calculates the exposure. The aperture 403 is then adjusted according to the exposure thus obtained.

Next, the controller/calculator 409 uses the signals output from the image sensing apparatus 404 to extract a high-frequency component and calculate the distance to the subject. The controller/calculator 409 then drives the lens and determines if the subject is in focus and, if the subject is not in focus, drives the lens again and measures the distance to the subject. Exposure commences once proper focus is achieved.

When exposure is completed, the image signals output from the image sensing apparatus 404 are A/D converted by the A/D converter 406 and written to the memory 410 via the signal processor 407 under the control of the controller/calculator 409.

Thereafter, the controller/calculator 409 writes the data accumulated in the memory 410 to the removable recording medium 412 via the recording medium controller I/F 411.

Or, the controller/calculator 409 may input the data accumulated in the memory 410 directly to the computer for image processing via the external I/F 413.

(Other Embodiments)

A description is now given of other and further variations of the embodiments of the present invention, with reference to FIGS. 6, 7, 8 and 9.

Figure 6:
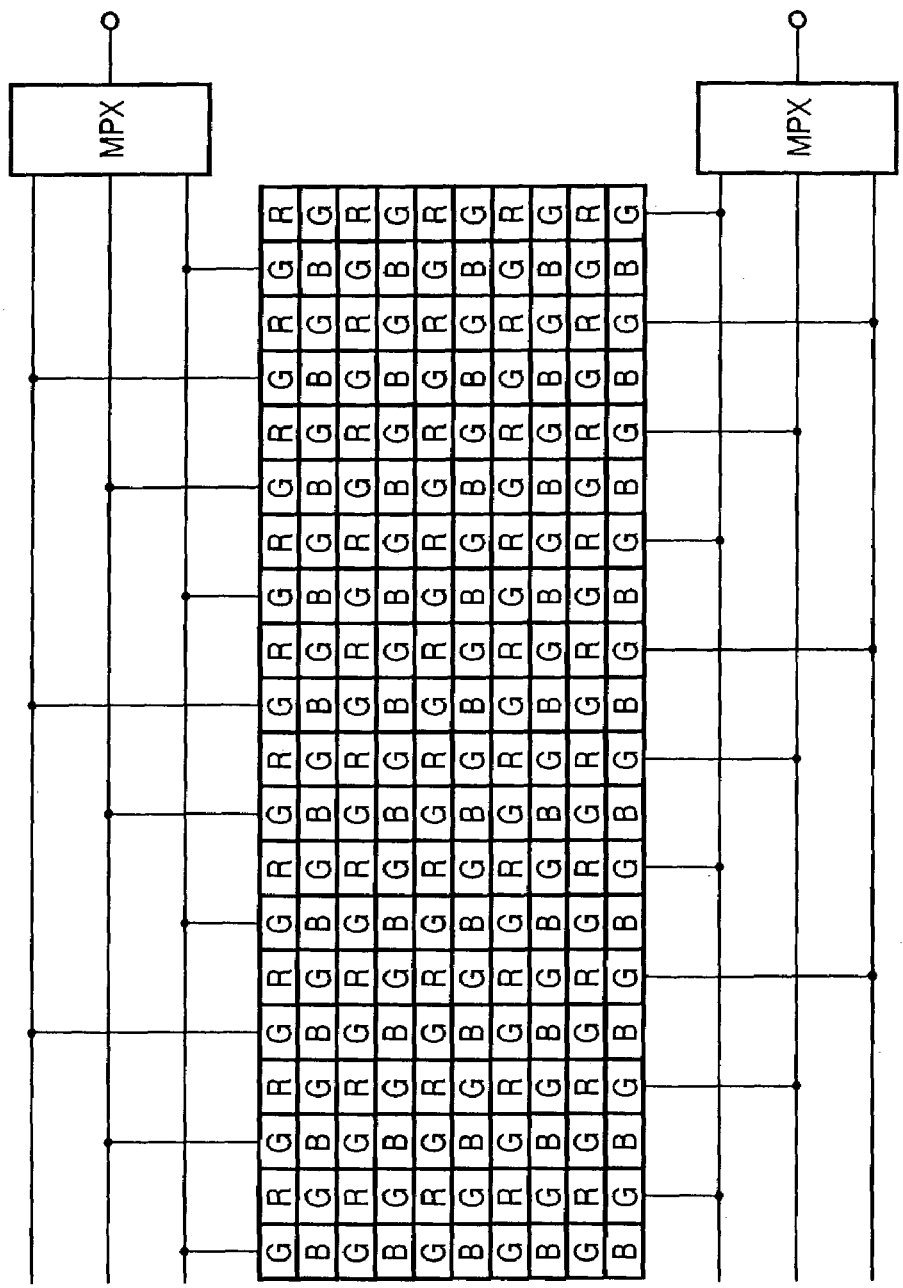
FIG. 6 is a diagram of the structure of an image sensing apparatus according to a first variation of the present invention.
Figure 7:
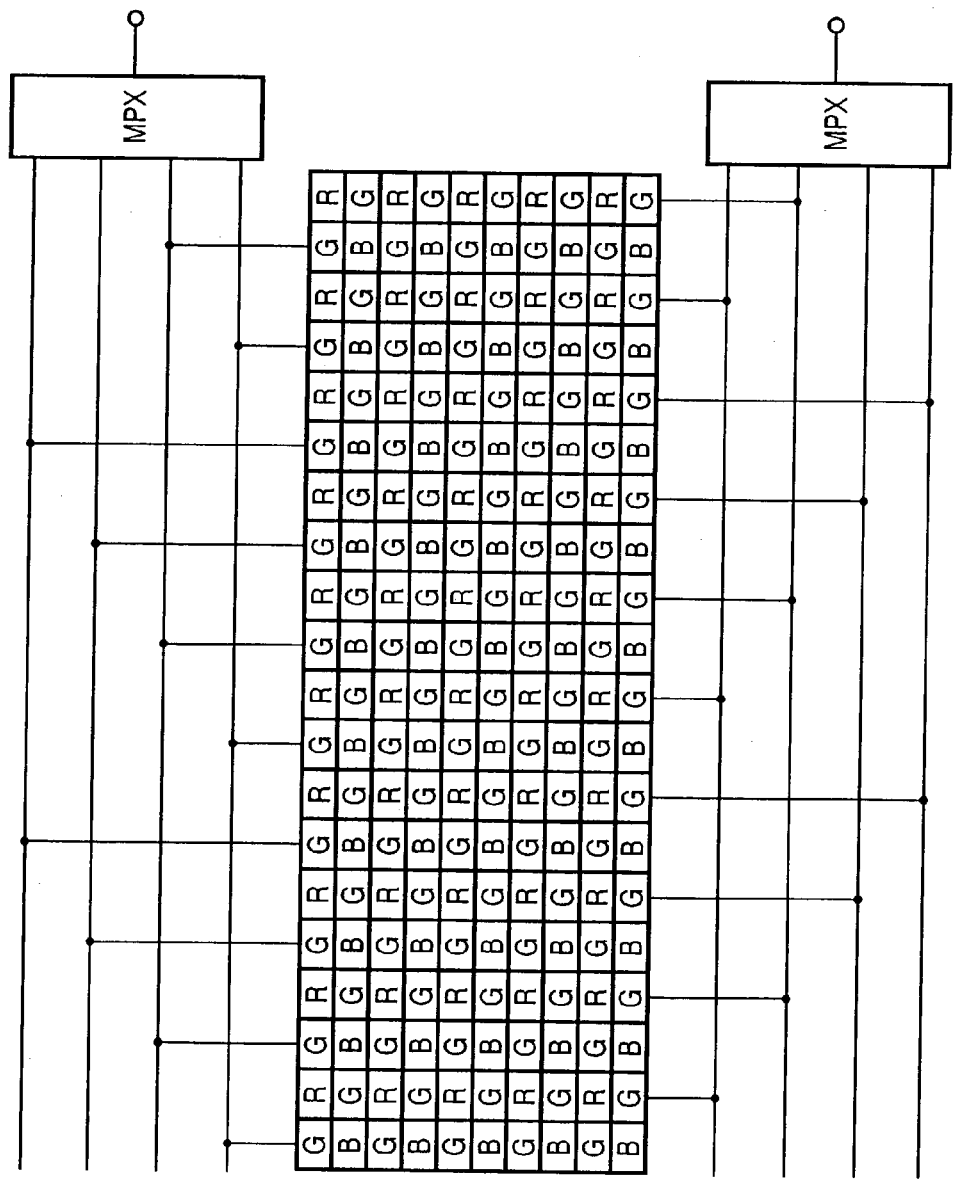
FIG. 7 is a diagram of the structure of an image sensing apparatus according to a second variation of the present invention.
Figure 8:
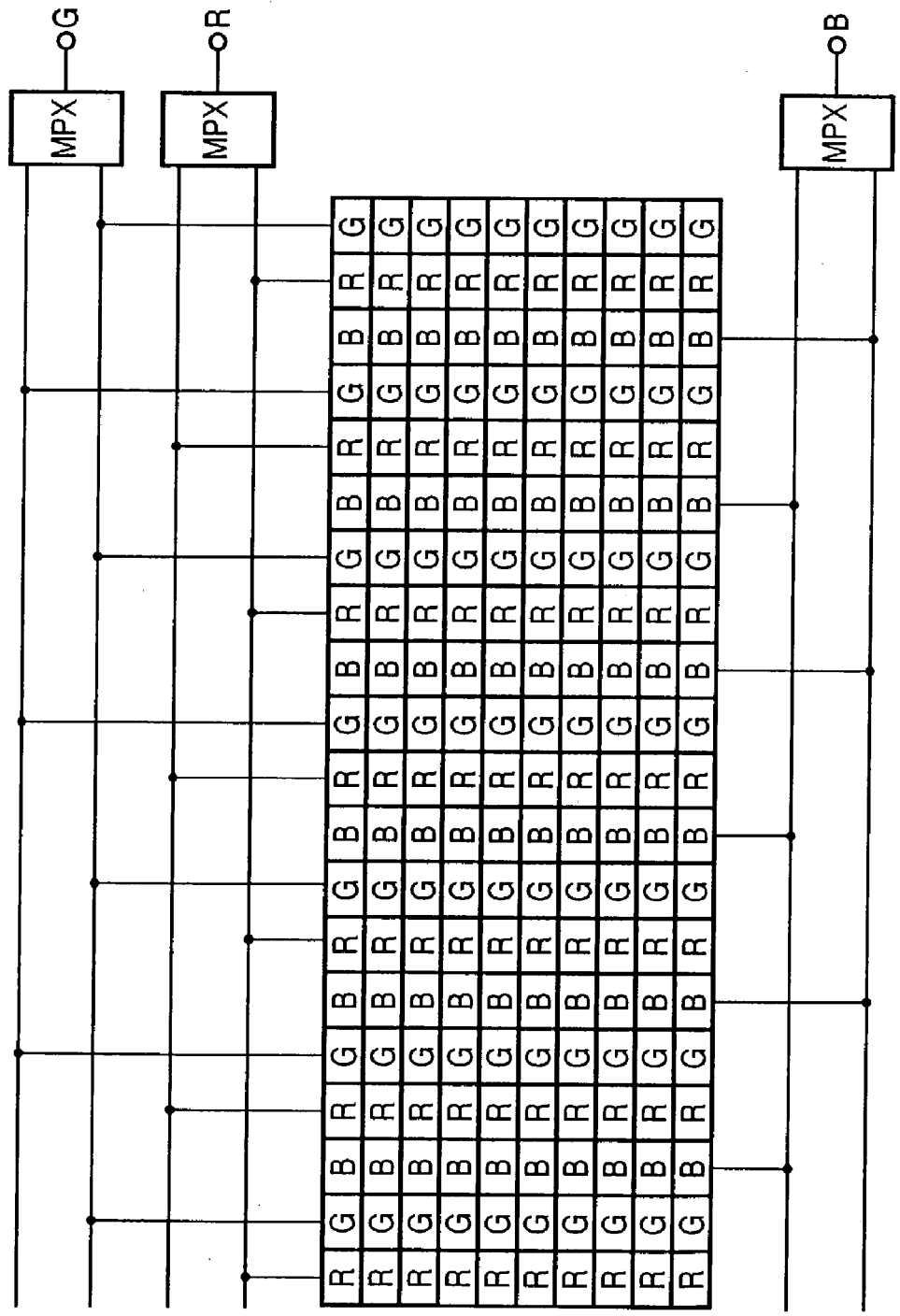
FIG. 8 is a diagram of the structure of an image sensing apparatus according to a third variation of the present invention.
Figure 9:
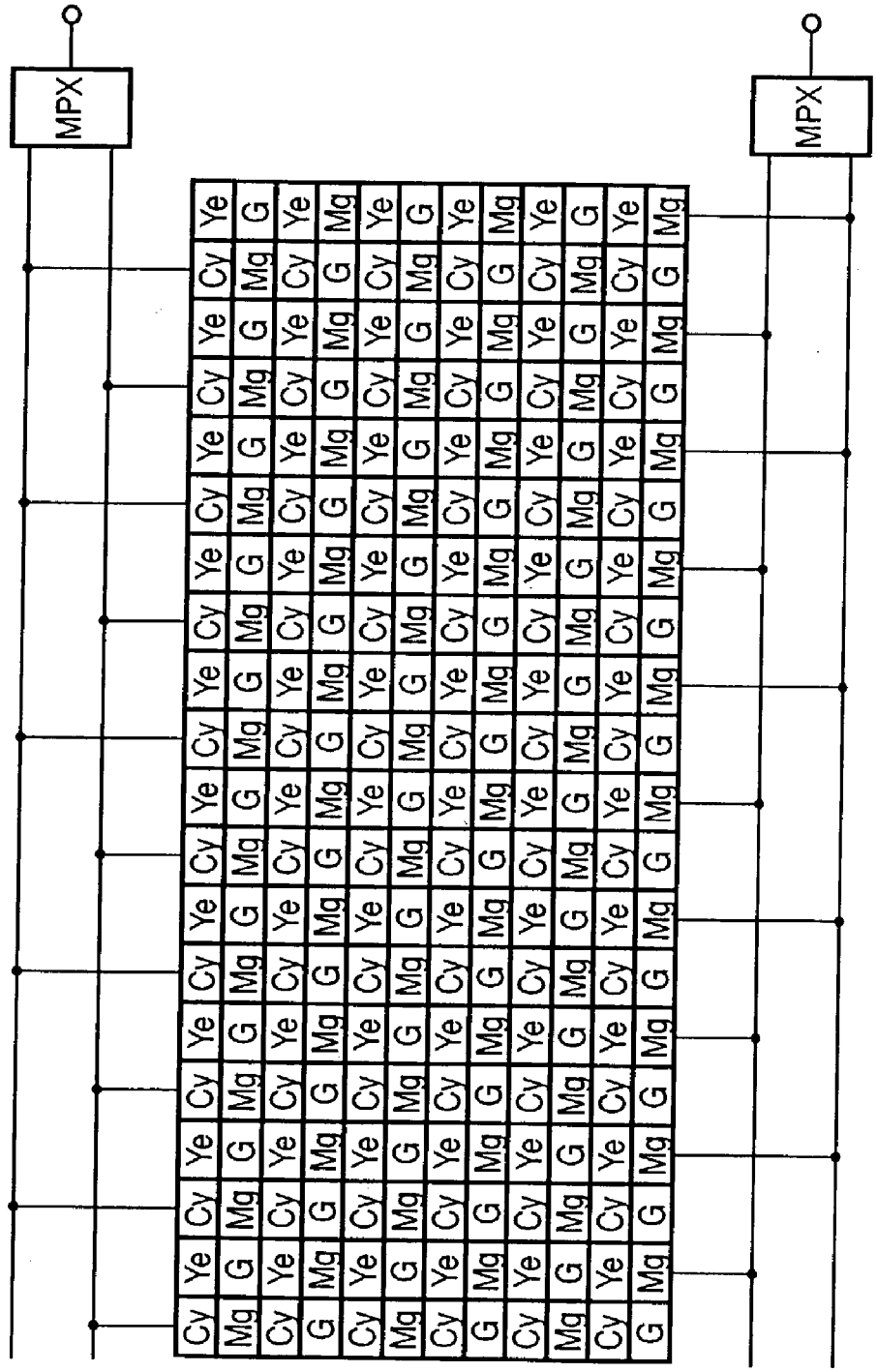
FIG. 9 is a diagram of the structure of an image sensing apparatus according to a fourth variation of the present invention.

FIG. 6 is a diagram of the structure of an image sensing apparatus according to a first variation of the present invention. FIG. 7 is a diagram of the structure of an image sensing apparatus according to a second variation of the present invention. FIG. 8 is a diagram of the structure of an image sensing apparatus according to a third variation of the present invention. FIG. 9 is a diagram of the structure of an image sensing apparatus according to a fourth variation of the present invention.

In the first, second and third embodiments described above, Bayer arrangement color filters are used, the four signal readout systems (the differential amplifiers 15–18, and the signal wires 101–104 which connects between capacitors CTN, CTS and the differential amplifiers 15–18) and two multiplexers 19 and 20 are used to obtain two outputs. However, as can be appreciated by those of ordinary skill in the art, the present invention is not limited to such arrangements, as is indicated by FIGS. 6–9. Thus, for example, the signal readout components may be constituted so as to comprise six systems (as depicted in FIG. 6) or even eight systems (as in FIG. 7). In such cases, even if the readout speed at the signal readout components does not change compared to a case in which one system is used, the sensor signal output rate can be increased three- and four-fold, respectively. In addition, by providing a horizontal scan circuit on each signal readout component, the clock frequency used at the horizontal scan circuit can be reduced to ⅓ or ¼ compared to a case in which a single horizontal scan circuit is used for multiple signal readout components.

In addition, the color arrangement of the color filter can be changed as needed, provided that the number of signal readout systems is at least twice the maximum number of colors of the color filters covering the pixels included in the lines. For example, if the color filter has a layout that repeats the sequence R,G,B in every line, a signal readout components arrangement comprising at least six systems may be used (FIG. 8).

In addition, the color filter need not be limited to the primary colors. Instead, a complementary color filter may be used (see FIG. 9).

The present invention is not limited to the above-described embodiments, and various changes and modifications can be made within the spirit and scope of the present invention. Therefore, in order to apprise the public of the scope of the present invention, the following claims are made.

What is claimed is:

1. An image sensing apparatus comprising:
   a photoelectric converter having a plurality of pixels covered by color filters composed of a plurality of colors;
   a plurality of common readout units adapted to sequentially output signals from the plurality of pixels, a time division multiplex (TDM) unit adapted to perform time division multiplexing on signals from the plurality of common readout units so as to output time division multiplexed signals; and
   a read-out control unit adapted to read out the signals from the plurality of pixels to the common readout units so that signals from pixels covered with color filters of the same color are multiplexed continuously,
   wherein the plurality of common readout units includes at least a first common readout unit, a second common readout unit, a third common readout unit and a fourth common readout unit; and
   the time division multiplex unit includes at least a first time division multiplex unit and a second time division multiplex unit,
   the first common readout unit, the second common readout unit and the first time division multiplex unit being provided on one of the side of the photoelectric converter,
   the third common readout unit, the fourth common readout unit and the second time division multiplex unit being provided on a side of the photoelectric converter opposite the side on which the first common readout unit, the second common readout unit and the first time division multiplex unit are provided,
   the first time division multiplex unit multiplexing signals from the first common readout unit and the second common readout unit,
   the second time division multiplex unit multiplexing signals from the third common readout unit and the fourth common readout unit.

2. The image sensing apparatus according to claim 1, wherein the plurality of common readout units sequentially outputs signals from a plurality of pixels of a selected line.

3. The image sensing apparatus according to claim 1, wherein the number of common readout units is a multiple of a maximum number of colors of the color filters that cover a line of pixels.

4. The image sensing apparatus according to claim 3, wherein the multiple is 2.

5. The image sensing apparatus according to claim 1, wherein the color filters use primary colors.

6. The image sensing apparatus according to claim 5, wherein the color filters are Bayer arrangement color filters.

7. The image sensing apparatus according to claim 1, wherein the color filters use complementary colors.

8. The image sensing apparatus according to claim 1, wherein:
   the apparatus stores a photoelectric charge obtained by photoelectric conversion at the pixels; and
   the common readout unit comprises:
   a noise readout unit adapted to read out a noise component of each pixel;
   an electrical charge readout unit adapted to read out a photoelectric charge superimposed on the noise components of each pixel; and
   a noise deletion unit adapted to output an image signal from which the noise component that is read out by the noise readout unit is deleted from the photoelectric charge read out by the electrical charge readout unit.

9. The image sensing apparatus according to claim 1, further comprising a plurality of drive units each adapted to drive each of the plurality of common readout units.

10. The image sensing apparatus according to claim 1, further comprising a plurality of drive units adapted to drive the plurality of common readout units, the drive units being provided for a plurality of said common readout units connected to each of said first and second time division multiplex (TDM) units.

11. The image sensing apparatus according to claim 1, further comprising:
   an analog-digital (A/D) conversion circuit adapted to convert analog signals from the plurality of common readout units into digital signals; and
   a signal processing circuit adapted to process signals from the analog-digital (A/D) conversion circuit.

* * * * *